United States Patent [19]

Ban

[11] 3,726,529

[45] Apr. 10, 1973

[54] MAGNETIC TAPE CARTRIDGE REMOVING APPARATUS

[76] Inventor: Itsuki Ban, 829, Higashi-Oizumimachi, Nerima-ku, Tokyo-to, Japan

[22] Filed: Oct. 5, 1970

[21] Appl. No.: 78,109

[30] Foreign Application Priority Data

Oct. 4, 1969 Japan ................................44/78952

[52] U.S. Cl. ...274/4 F, 179/100.2 Z, 179/100.2 CA, 274/4 A

[51] Int. Cl. .........................G11b 23/12, G11b 15/26

[58] Field of Search........................274/4 B, 4 E, 4 F, 274/4 G, 4 C, 11 B, 11 C, 11 E; 179/100.2 Z

[56] References Cited

UNITED STATES PATENTS

| | | | |
|---|---|---|---|
| 3,289,962 | 12/1966 | Gellenthin | 274/4 F |
| 3,512,785 | 5/1970 | Ban | 274/4 F |
| 3,512,786 | 5/1970 | Ban | 274/4 F |
| 3,582,082 | 6/1971 | Takagi | 274/4 F |
| 3,589,733 | 6/1971 | Piotrowski | 274/4 F |

FOREIGN PATENTS OR APPLICATIONS

| | | | |
|---|---|---|---|
| 1,934,808 | 5/1970 | Germany | 274/4 F |

*Primary Examiner*—Leonard Forman
*Assistant Examiner*—Dennis A. Dearing
*Attorney*—Jacobs & Jacobs

[57] ABSTRACT

A magnetic tape cartridge removing apparatus in a tape player for playing a vertical stack of cartridges from the lowermost to the uppermost in succession in a bottomless enclosure, comprises a player cabinet, a platform which is provided within the cabinet and on which the lowermost cartridge rests, a movable deck resting on the platform for playing the cartridge in the play position, said movable deck mounting thereon a capstan and magnetic head or the like, deck driving means for reciprocally moving the deck between such positions of engagement with and disengagement from the cartridge in the play position, and a pushing member operable to depressedly move the cartridge in the play position from the play position during the time that the deck is reciprocally moved by deck driving means.

4 Claims, 6 Drawing Figures

MAGNETIC TAPE CARTRIDGE REMOVING APPARATUS

BACKGROUND OF THE INVENTION

This invention relates to a tape cartridge player utilizing a plurality of endless magnetic tape cartridges, and more particularly to a magnetic tape cartridge removing apparatus for a tape cartridge player of the type that a plurality of the cartridges in a stack are successively played from the lowermost to the uppermost, wherein the tape cartridge is moved from the play position upon ending its play and then the next cartridge is brought to the play position.

A magnetic tape cartridge player of the type that the stacked tape cartridges are successively played from the lowermost to the uppermost has been proposed by, for instance, my U.S. Pat. No. 3,512,786.

In such magnetic tape cartridge player, it is necessary to move the played cartridge from the play position in order to play the next cartridge. Movement of the cartridge requires a relatively strong force and long distance. For this reason, an electromagnetic plunger or the like is not suitable for the purpose as above mentioned.

The inventor for this application has succeeded in obtaining a new and useful apparatus by which the tape cartridge in the play position is moved in a stable and positive manner from the play position upon use of rotational force of the capstan for driving the tape within the cartridge.

SUMMARY OF THE INVENTION

It is, therefore, a primary object of the invention to provide a magnetic tape cartridge removing apparatus for a tape cartridge player of the type where a plurality of the cartridges in a stack are successively played from the lowermost to the uppermost, wherein the tape cartridge is moved from the play position upon ending its play and then the next cartridge is brought to the play position.

Another object of the invention is to provide a magnetic tape cartridge removing apparatus, wherein a platform is provided to carry the lowermost tape cartridge out of a plurality of stacked cartridges, and wherein a pushing lever is slidably mounted on the platform in opposition to the lowermost cartridge and is operated to automatically move the cartridge from the play position upon ending of the play thereof.

Still another object of the invention is to provide a magnetic tape cartridge removing apparatus, wherein a movable deck on which is mounted a rotatable capstan and a magnetic head and the like for playing the cartridge in the play position, the pushing lever being connected by a belt to a drum which is rotatably driven by the capstan upon ending of the play of the cartridge to move the deck from the cartridge, the pushing lever being moved from the play position when the belt is taken up by the drum as rotated, and wherein the pushing lever is automatically returned to its original position when the cartridge is retracted from the play position, the next cartridge being brought to the play position.

These and other objects, features and advantages of the invention will become more apparent through a consideration of the following detailed description.

DESCRIPTION OF THE PREFERRED EMBODIMENTS

Figure 1:
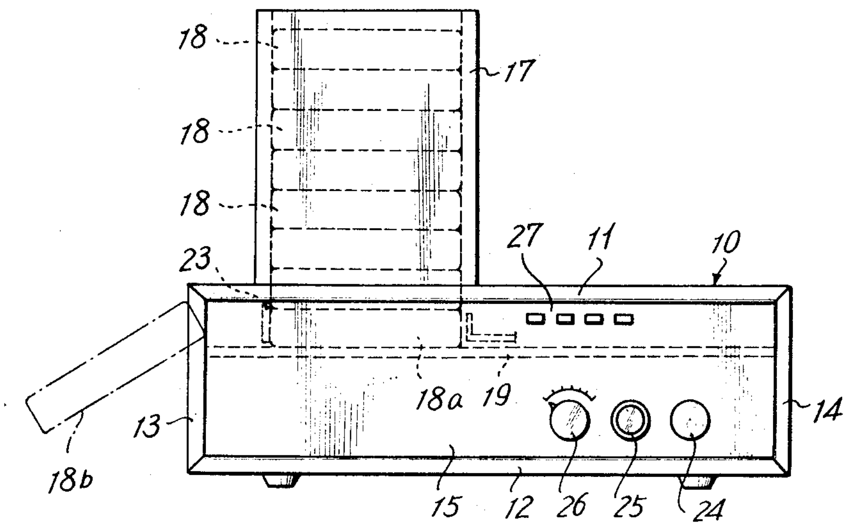
FIG. 1 is a front view of an endless magnetic tape cartridge player according to the invention.

In FIG. 1, there is shown a tape playing cabinet 10, having top and bottom walls 11, 12, opposed side walls 13, 14, a front wall 15, and a rear wall (not shown). Vertically mounted on the tape wall 11 of the cabinet 10 is a bottomless enclosure 17 receiving a stack of plurality of tape cartridge cases. The enclosure 17 is a hollow, square pillar and is adapted to receive the tape cartridge cases 18 from the upper opening. The tape wall 11 is bored through at a portion opposed to the enclosure 17 to allow the lowermost tape cartridge case 18 to rest on a horizontal platform 19 provided within the cabinet. An endless magnetic tape cartridge 20 (FIGS. 2 and 3) is received in the tape cartridge case 18a which rests on the platform 19. As will be described later, the tape cartridge case **18*a* escapes from an opening 21 (FIG. 3) in the side wall 13 out of the cabinet 10 to a position as indicated at 18*b* when the tape cartridge 20 ends its play. This allows the next tape cartridge case to fall down by its dead weight load to the platform 19 and to rest thereon for its play. In this manner, the tape cartridge cases 18 are allowed to successively rest on the platform 19 from the lowermost to the uppermost whereby each of the tape cartridges are bought to the play position and thus played. A guide plate 22 is pivotally mounted to a point 23 to guide the tape cartridge falling from the enclosure 17 on the platform 19** and is given a counterclockwise rotational force by a weak resilient spring (not shown).

The cabinet 10 is provided at its front wall 15 with a power control knob 24 used for controlling operation of the tape player, a control knob 25 for a stereo balancing setting, a volume control knob 26 used for controlling volume and track or channel indicator 27.

Figure 2:
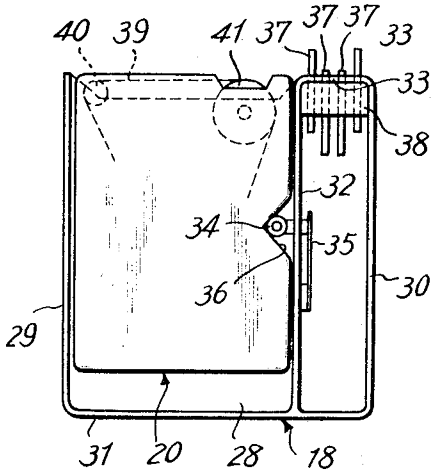
FIG. 2 is a plan view of the tape cartridge case shown in FIG. 1.

The tape cartridge case 18, as best seen from FIG. 2, includes a square base plate 28, side walls 29, 30 and rear wall 31 upwardly extending from the base plate at its periphery edges, a partition wall 32 upwardly extending the base plate at a right angle with respect to the rear wall, and a front wall 33 which upwardly extends from the base plate and is connected to the partition wall 32. The tape cartridge 20 is positioned between the partition wall 32 and the side wall 29. A retention roller 34 is provided on a displaceable member 35 made of a leaf spring of which one end is mounted to the base plate by a suitable manner. The cartridge 20 is provided with a notch 36 on the side wall thereof to receive the retention roller 34 therein when inserted and held in the case 18. The base plate 28 is depressed at its front edge as indicated by the dotted line so as to allow the cartridge 20 to expose its leading edge. A block 38 is provided on the base plate 28 to slidably mount four rods 37 which are adapted for indexing playing tracks on the magnetic tape 39 within the cartridge. Each of the rods 37 has one end passing through holes (not shown) formed in the front wall 33 outwardly of the case 18 and the other end extending through bores (not shown) formed in the block 38 inwardly of the case. Each rod 37 is adapted to selectively set to first and second positions by either manually pulling the one end or depressing the other end and either depressing the one end or pulling the other end.

The tape cartridge 20 is generally rectangular with a centrally disposed reel assembly (not shown) on which the endless magnetic tape 39 is wound and unwound in conventional manner. The tape 39 passes over a tape guide 40 and a pinch roller 41. The tape guide 40 and the pinch roller 41 are disposed adjacent the leading edge of the cartridge whereat the cartridge side wall is cut away or dispensed with and the tape 39 is extended from the center of the hub of the reel (not shown) about the guide 40 and thence about the pinch roller 41 back to the outer periphery of a roll formed by the tape wound about the hub.

Figure 3:
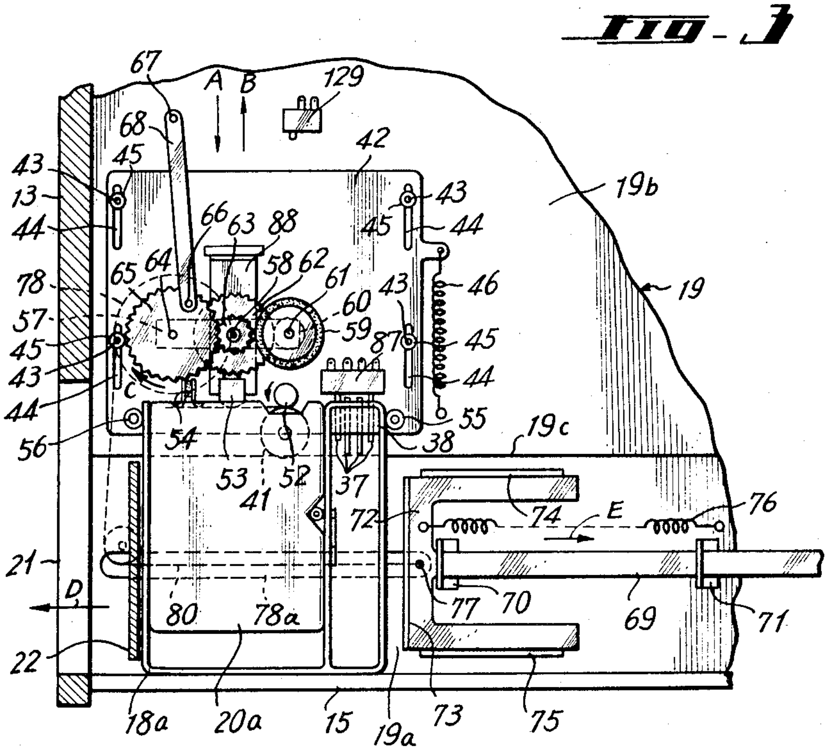
FIG. 3 is a plan view showing a mechanism which is within the player cabinet of FIG. 1 and is related to a basis of the invention.

FIG. 3 shows a mechanism which forms a basis of the invention and is provided in the cabinet 10, wherein similar numerals are used to illustrate like parts in FIG. 1 and 2. The horizontal platform 19 has a high surface portion **19*a* and a low surface portion 19*b* defined by a step portion 19c**.

Numeral 42 is a deck which is slidably supported by guide rods 43 that pass through holes formed in the deck and are mounted on the lower surface portion 19b of the platform 19. Upward and downward movement of the deck 42 is limited by rings 45 mounted on the rods 43. On the other hand, the deck 42 is intended to be moved in the direction of arrow A by a tension spring 46. As shown, the deck 42 is shown as being held in a reproducing position against the bias of the tension spring 46 and the edge of the deck 42 is engaged by a latch lever 47 (FIG. 5) provided on the platform 19. The latch lever 47 is supported through a guide 48 by a suitable support member 49 fixed to the platform 19 so as to be vertically slidable. The latch lever 47 is normally and upwardly biased by a spring 50, and movement thereof by the bias of the spring 50 is limited by engagement of a stopper pin 51 on the lever 47 with the platform 19. The latch lever 47 has one upper end upwardly extending through an opening (not shown) bored through the platform 19. The height of the latch lever 47 extending over the deck 19 is such that it is lower than the height of the high surface portion 19a of the deck 19.

A rotatable capstan 52 is provided on the deck 42 to abut against the pinch roller 41 in the cartridge 20a in the case **18*a* which escapes from the enclosure 17 and rests on the high surface portion 19*a* of the platform 19 to drivingly transport the tape 39 in the cartridge. Further, a magnetic head 53 for reproducing the tape 39 in the cartridge, an endmark detector 54 for controlling operation of magnetic head shift means for changing over the record tracks on the magnetic tape within the cartridge to be played by shifting the magnetic head 53, are also provided to the deck 42. The capstan 52 is rotatably driven in the direction of the arrow as shown by capstan driving means including a motor (not shown) mounted to the deck thereunder. In addition to the capstan 52 and the magnetic head 53, there are provided on the deck 42 guides 55, 56 for securing relative position of the tape cartridge case 18*a* in the play position with respect to the deck 42. When the deck 42 is in the reproducing position, the capstan 52 abuts against the pinch roller 41 within the cartridge 20a in the play position and the tape 39 within the cartridge is drivingly transported across the magnetic head 53, as well known, by coaction of the capstan 52 with the pinch roller 41**.

The tape cartridge player includes deck driving means for slidably moving the deck 42 between the reproducing position and a retracted position where the capstan 52 is disengaged from the pinch roller 41 within the cartridge **20*a*. The deck driving means has a swingable lever 57 pivotally mounted on a shaft 58 on the deck 42. A rubber covered frictional idler wheel 59 and a gear 60 connected to each other are rotatably supported on an axis 61 on the swingable lever 57. The idler wheel 59 as will be described later is caused to abut against the capstan 52 by rotation of the swingable lever 57 from the position as shown in the clockwise direction and is rotatably driven by the capstan 52. Integrally formed gears 62 and 63 are rotatably supported on the shaft 58 on the deck 42. The gear 62 is adapted to mesh with the gear 60. Mounted on a shaft 64, which is rotatably provided by a suitable bearing (not shown) to the swingable lever 57, is a gear 65 meshing with the gear 63. The gears 60, 62, 63 and 65 constitute a reduction gearing and rotation of the idler wheel 59 is reduced to be imparted to the gear 65. The shaft 64 extends downwardly of the swingable lever 57 and passes through an arc-shaped slot formed in the deck 42 downwardly of the deck 42. The platform 19 is widely bored to allow the shaft 64 to extend downwardly of the platform 19, though not shown in particular in the drawing. A pin 66 is mounted on the gear 65 eccentrically of the center thereof and is connected by a link 68 to a pin 67 on the platform 19. Swingable movement of the swingable lever 57 is normally prevented by the link 68**.

If the latch lever 47 is moved to permit disengagement from the edge of the deck 42, the deck 42 is slidably moved by the bias of the tension spring 46 in the direction of arrow a and at the same time the swingable lever 57 is clockwise pivoted about the shaft 58 to allow the idler wheel 59 to abut on the capstan 52. Thus the idler wheel 59 is rotatably driven by the capstan 52 to rotate the gear 65 with the shaft 64 in the direction of arrow C. Since the gear 65 is connected by the link 68 to the platform 19, the deck 42 is gradually and slidably moved in the direction of arrow B against the bias of the tension spring 46 as the gear 65 is rotated. The gear 65 is rotated through a half revolution to allow the deck 42 to move to a retracted position where the capstan 52 and the magnetic head 53 are away from the cartridge **20*a* while the guides 55, 56 is away from the front edge of the tape cartridge. With further rotation of the gear 65, the deck 42 is moved in the direction of arrow A by the bias of the tension spring 46 and is returned to the reproducing position where it is engaged by the latch lever 47. The idler wheel 59 is away from the capstan 52 and rotation of the gear 65 is prevented at a point where the gear 65 is rotated through one revolution from the initial position just prior to return of the deck 42** to the reproducing position.

According to the invention, the tape cartridge removing apparatus functions to move the tape cartridge case 18a placed on the platform 19 in the direction of arrow D to escape from the opening 21 in the side wall 13 of the cabinet 10 outwardly of the cabinet during the time that the deck 42 is reciprocally moved by the deck moving moving means between the reproducing position and the retracted position. The tape cartridge removing apparatus includes a pushing lever 69 slidably supported by substantially L-shaped support or guide members 70, 71 fixed to the platform 19. The pushing lever 69 is provided at one end with a substantially U-shaped head member 72 integrated therewith. The head member 72 has bent portions 73, 74 and 75 upwardly extending from the peripheral edges thereof. The distance between the respective upper edges of the bent portion 73 to 75 and the platform 19 is less than the thickness of the tape cartridge case 18*a*. The pushing lever 69 is normally biased by a tension spring 76 in the direction of arrow E, and movement of the lever 69 is prevented, as shown, by engagement of the head member 72 with the supporter 70. The pushing lever 69 includes a pin 77 which extends through an elongated slot 78 formed in the platform 19 downwardly thereof. The pin 77 is connected by a belt 80 made of steel or the like to a drum 78*a* which is rotatably supported through a sleeve 79 by a shaft 64 at lower end thereof extending downwardly of the platform 19. As will be described later, the pushing lever 69 is moved against the bias of the spring 76 when the drum 78 is rotated and the belt 80 is guided by a guide roller 81 on the platform 19 and then wound into the drum 78.

Figure 4:
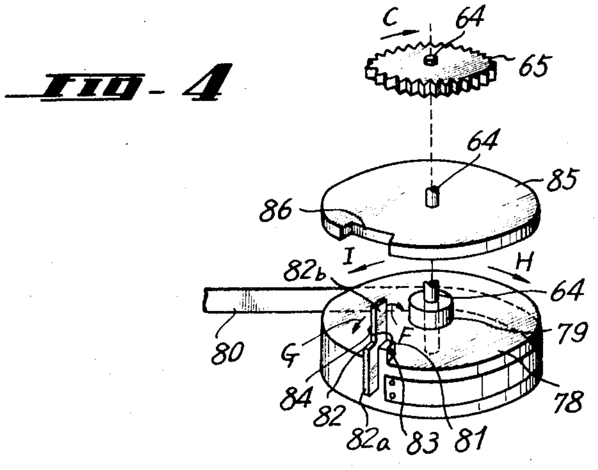
FIG. 4 is an explodedperspective view of an arrangement for moving the pushing lever in FIG. 3.

The details of the drum 78 will be explained hereinafter by reference to FIG. 4.

The drum 78 has a projective portion 81 at its upper surface to which a lever 82 is pivotally mounted by an axis 83. The lever 82 includes an arm 82*a* extending outwardly of the periphery of the drum 72 and an arm 82*b* projecting upwardly of the drum 78. The lever 82 is normally biased by a spring 84 in the direction of arrow F. A groove (not shown) is formed in the drum 78 to receive the arm 82*a* so as to allow the lever 82 to be swung against the bias of the spring 84 when the drum 78 is rotated and the arm 82*a* of the lever 82 is depressed by the belt 80 wound to the drum 78. A disk 85 upwardly spaced from the drum is mounted on the shaft 64. The disk 85 is provided with a notch at the periphery thereof to receive the arm 82*b* of the lever 82.

As above described, when the gear 65 is rotated in the direction of arrow C upon reciprocal movement of the deck 42, the disk 85 is bodily rotated with the gear 65 by the shaft 64 and the drum 78 is rotated in the direction of arrow H by the lever 82 engaging the notch. As the drum 78 is rotated in the direction of arrow H, the belt 80 is taken up by the drum 78 and the pushing lever 69 is moved against the bias of the spring 76. By movement of the pushing lever 69, the head member 72 of the pushing lever is allowed to move the tape cartridge case 18*a* in the play position in the direction of arrow D. Prior to full rotation of the gear, the case 18*a* is discharged from the opening 21 in the cabinet 10 to assume the position 18*b* (FIG. 1). Thereafter, a portion of the belt 80 taken up by the drum 78 overlaps on the arm 82*a* of the lever 82 to pivot the latter in the direction arrow G against the bias of the spring 84. This allows the arm 82*b* of the lever to permit disengagement from the notch 86 of the disk 85. As a result, the drum 78 is allowed to rotate in the direction of arrow I by the belt 80 in response to movement of the pushing lever 69 by the bias of the tension spring 76 in the direction of arrow E. When the pushing lever 69 is returned to a position as shown in FIG. 3 and the gear 65 is rotated through one revolution, again the arm 82*b* of the lever 82 engages the notch 86 of the disk 85 to establish a connection of the disk 85 and the drum 78.

After the pushing lever 69 has depressed the tape cartridge case 18a outwardly of the cabinet 10, the pushing lever 69 is returned to its original position as shown in in FIG. 3 to allow the next tape cartridge case 18 above the preceding case to fall on the platform and thus bring to the play position. The deck 42 is then returned to the reproducing position to initiate the play of the cartridge 20 received in the case.

Four switches as will be fully described later are received in a switch block 87 mounted on the deck 42, each of the switches being selectively actuated by the rods 37 of the tape cartridge case 18.

Figure 5:
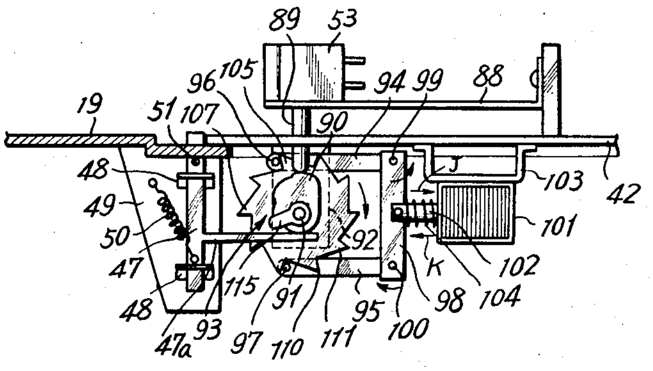
FIG. 5 is a side view of a magnetic head shifting mechanism shown in FIG. 3.

FIG. 5 shows a mechanism by which the magnetic head 53 is shifted to select the record tracks on the magnetic tape to be played, wherein similar numerals are used to illustrate like parts shown in FIG. 3. The magnetic head is firmly secured to a displaceable member 88 formed of leaf spring which one end of portion is fixed to the deck 42. A hole (not shown) is formed in the displaceable member 88 to receive the shaft 58 for supporting the swingable lever 57 one end of which is mounted to the deck 42. Rigidly mounted to the member 88 at the under side thereof is a pin 89 which passes through an opening (not shown) in the deck 42 and extends downwardly of the deck. The rounded bottom end of the pin 89 is arranged to ride on a cam 90 which is mounted on a shaft 91 rotatably provided on a support member 92 mounted on the deck 42 thereunder. The displaceable member 88 is given the downward elastic force to maintain the pin 89 and a cam 90 in an operateve relation. A ratchet wheel 93 is firmly mounted to the shaft 91. The cam 90 is adapted to be rotated when the ratchet wheel 93 as will be described in detail later is drivingly rotated. Rotation of the cam 90 allows the displaceable member 88 swung by the pin 89 to move the magnetic head 53. The cam 90 is arranged to encounter itself four stages when moved up and down. Accordingly, the magnetic head 90 is allowed to be moved to a position suitable for four record-tracks (eight tracks in case of stereo).

The ratchet wheel 93 includes ten gear teeth. R Reciprocating lever 94, 95 are provided in relation to the ratchet wheel 93 and pins 96, 97 mounted on the levers 94, 95 mesh with the two teeth. The reciprocating levers 94, 95 are pivotally mounted on a lever 98 by pins 99, 100 is turn provided on end portion of the lever 98 and urged by springs (not shown) in the direction of the arrows. The lever 98 is connected to a plunger 102 of a solenoid 101 fixed by a bracket 103 to the deck 42 at the under side thereof. Energization of the solenoid 101 allows the plunger 102 to be attracted in the direction of arrow J against the bias of a compressive spring 104 and to be moved accordingly. With movement of the plunger 102, the levers 94, 95 are caused to be moved and the pin 96 which is on the lever 94 engages the tooth 105 to rotate the ratchet wheel 93 by one tooth in the clockwise direction. At this time, the pin 97 on the lever 95 is brought to such the state in which it is engaged by the tooth 111 since the pin 97 is caused to pass over the teeth 110, 111 by rotation of the ratchet wheel 93 and movement of the lever 95. When the solenoid 101 is deenergized, the plunger 102 and the levers 94, 95 are movably restored by the bias of the compressive spring 104 in the direction of arrow to thus allow the pin 97 on the lever 95 to depress the tooth 111 to rotate the ratchet wheel 93 in the clockwise direction by one tooth. Assuming that the plunger 102 is fully returned to its original position, the pin 96 engages the tooth 107 of the ratchet wheel 93. That is, the ratchet wheel 93 is rotated in the clockwise direction by two teeth, namely 72° whenever the solenoid 101 is energized.

An actuating member 115 with the cam 90 is rigidly mounted to the shaft 91 and rotated therewith. An arm 47*a* is integrated with the latch lever 47 and extends downwardly of the actuating member 15. The actuating member 155 is allowed to abut against the arm 47a of the latch lever 47 to move the latter against the bias of the spring 50 to thus establish disengagement from the deck 42 whenever the actuating member 115 with the cam 90 is rotated through one revolution. More specifically, after the cam 90 has been rotated through one revolution to allow the magnetic head 53 to scan all the tracks on the magnetic tape, the latch lever 47 is disengaged from the deck 42 and in response thereto reciprocal movement of the deck 42 is initiated to automatically effect exchange of the tape cartridge to be played.

Figure 6:
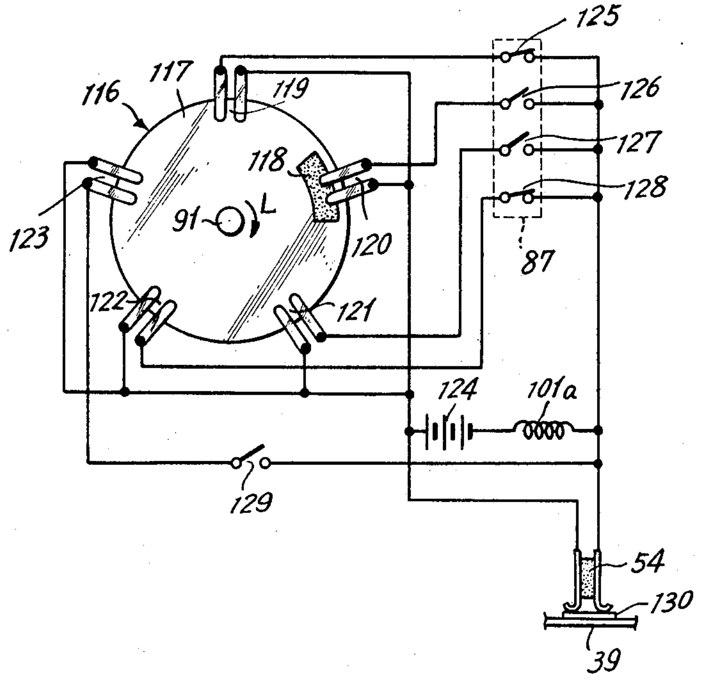
FIG. 6 is a diagram showing a control circuit for the solenoid in FIG. 5.

FIG. 6 shows means for controlling rotation of the cam 90 by controlling the current supply to the solenoid 101. In the drawings, similar numerals are used to illustrate like parts in FIGS. 3 and 5.

This means includes a rotary switching means 116 actuatable as the cam 90 is rotated. The rotary switching means 116 comprises a rotary disk 117 of insulation mounted to the shaft 91 carrying the cam 90. A conductive piece 118 is provided on the rotary disk 117 at the surface thereof. Switches 119 and 123 each consisting of a pair of contacts are mounted on a fixed member (not shown) of insulation, which is provided corresponding to the rotary disk 117 as the shaft 91 is rotated. In series, running from plus terminal of the power source 124 to minus terminal of the source, are the switch 119, a normally-opened switch 125 and an exciting coil 101*a* of the solenoid 101. In series, running from plus terminal of the source 124 to minus of the source, are the switch 120, a normally-opened switch 126 and the coil 101*a*. In series, running from plus terminal of the source 124 to minus terminal of the source, are the switch 121, a normally-opened switch 127 and the coil 101*a*. In series, running from plus terminal of the source 124 to minus terminal of the source, are the switch 122, a normally-opened switch 128 and the coil 101*a*. The switches 125 to 128 are stored in the switch block 87 (FIG. 3) on the deck 42 and each of the switches is adapted to be actuated and closed by one of the rods 37 provided to the tape cartridge case 18, which is set to the first position where the end of the rod is projected outwardly. FIG. 6 shows the switches 125 and 128 in a position where they are actuated and closed by the rods 37. In series, running from plus terminal of the source 124 to minus terminal of the source, are the switch 123, a normally-opened swithc 129 and the coil 101*a*. The swithc 123 on the platform 19 is adapted to be actuated and closed by the deck 42 when the deck 42 is moved from the reproducing position to the retracted position. In series, running from plus terminal of the source 124 to minus terminal of the source, are the endmark detector 54 on the deck 42 and the coil 101*a*. The endmark detector 54 consists of two feeler contacts that are shorted by a conductive patch 130 provided on the magnetic tape 39 within the cartridge and member of insulation for supporting the contacts. In FIG. 6, the second track is in the play condition upon opening of the track selecting switches 126 and 127 so as to play the second and third tracks on the tape 39. When the two feeler contacts of the endmark detector 54 is shorted by the conductive patch 130 on the tape 39 upon completion of reproduction of the second track, the solenoid 101 is energized by the source 124 to rotate the shaft 91 by 72° in the direction of arrow L. Due to rotation of the shaft 91, the rotary disk 117 is rotated to a position where the switch 121 is closed by the conductive piece 118. In spite of closing of the witch 112, the solenoid 101 is not caused to be energized not to rotate the shaft 91 since the track selecting switch 127 has been opened. Thus, the third track on teh tape 39 correspinding to the switch 127 begins reproduction. When the connection between the two feeler contacts of the endmark detector 54 is shorted by the conductive patch 130 on the tape 39 after the third track has completed its reproduction, the solenoid 101 is energized from the source 124 to rotate the rotary disk 117 and the cam 90 by 72°. With rotation of the rotary disk 117, the conductive piece 118 is away from the switch 121 and is shifted to a position where the switch 122 is closed. Thus, the solenoid 101 is energized from the source 124 via the swithc 122, the switch 128 to rotate the shaft 91 by 72° in the direction of arrow L. Due to rotation of the shaft 91, the rotary disk 117 is rotated to a position where the switch 123 is closed by the conductive piece 118. When the shaft 91 is rotated to allow the swithc 123 to be closed by the conductive piece 118, the actuating member 115 on the shaft 91 urges the arm of the latch lever 47 to move the latch lever 47 against the bias of the spring 50 thereby establishing disengagement from the deck 42. Cosequently, as mentioned above, exchange of the cartridge to be played is effected in response to initiation of reciprocal movement of deck 42. More specifically, the cartridge 20*a* stored in the case 18*a* is discharged from the cabinet 10 after the second and third tracks on the tape have been reproduced. When the deck 42 is moved to the retracted position to actuate and close the switch 129, the solenoid 101 is energized through the switches 123 and 129 by the source 124. As a result, the shaft 91 is rotated to allow the conductive piece 118 to close the switch 119 and on the other hand the cam 90 is rotated to shift the magnetic head 53 to a level whree the first track on the tape corresponding to the switch 125 is played. At this moment, the actuating member 115 is released from compression of the latch lever 47 and the latch lever 47 is returned to a position where the deck 42 which is returned to the reproducing position is retained. In response to retractive movement of the deck 42 to the reproducing position, the next cartridge brought to the play position initiates its play. If the rods 37 for the tape cartridge case 18 accommodating this cartridge are set to close and operate the switch 126 to 128 only, the first track on the tape within the cartridge is played and the cartridge is then automatically discharged from the cabinet 10 to continuously play successive cartridge.

It is to be understood that the embodiment of the invention which has been described is merely illustrative of the priciples of the invention. Numerous modifications and changes may be made without departing from the true spirit and scope of the invention.

What is claimed is:

1. In a magnetic tape cartridge player utilizing a plurality of endless magnetic tape cartridges for playing a vertical stack of a plurality of tape cartridge from the lowermost to the uppermost in succession, a magnetic tape cartridge removing apparatus comprising a player cabinet; a horizontal platform which is provided in the player cabinet and on which the lowermost cartridge rests; a movable deck on the platform; a rotatable capstan on the deck, said capstan being adapted to forcedly abut against a pinch roller in the lowermost cartridge held in the play position; deck driving means for reciprocally moving the deck between a reproducing position where the capstan engages the cartridge in the play position and a retracted position where the capstan is disengaged from the cartridge in the play position; an idler wheel mounted on said deck in opposition to the capstan, means for abutting said idler wheel against the capstan to be rotated by the capstan during the period when the deck is moving between said reproducing and retracted positions; a drum operable to be rotatable in response to rotation of the idler wheel; a pushing lever slidably mounted on the platform for reciprocal movement toward and away from said cartridge in the play position, said pushing lever having a head member to oppose a cartridge in the play position; bias means for normally urging the pushing lever to an original position where the head member of the pushing lever is away from the cartridge in the play position; a belt connecting the drum to the pushing lever, said drum being operable to take-up the belt while being rotated in response to rotation of said idler wheel; and drum means for allowing the belt to be unwound when the rotation of said drum is arrested, the pushing lever being moved into engagement with said cartridge in the play position to thereby move said cartridge away from the play position a sufficient distance to enable another cartridge to replace it as the pushing lever is moved against the bias of the bias means in response to take-up of said belt on said drum, the pushing lever being returned to the original position by the bias of the bias means and said belt being thereby unwound in response to arrest of rotation of the drum.

2. A magnetic tape cartridge removing apparatus in accordance with claim 1, wherein said drum is rotatably mounted on a shaft operable to be rotated in response to rotation of said idler wheel, a rotary member mounted on said shaft coaxially with and spaced from the drums said drum means including a latch lever pivotally mounted on the drum, the latch lever being normally biased by a spring to have a latch lever first end engage the rotary member, the latch lever having a second end positioned adjacent the periphery of the drum, the latch lever being operable to be pivoted by the belt taken up by the drum, rotation of the drum associated with rotation of the idler wheel being arrested when the latch lever first end is disengaged from the rotary member upon pivoting of said latch lever, the pushing lever being freely rotated with respect to the shaft when it is returned to said original position by the bias of said bias means.

3. A magnetic tape cartridge removing apparatus in accordance with claim 2, wherein said abutting means includes bias means for normally urging said deck in the direction of the cartridge in the play position.

4. A magnetic tape cartridge removing apparatus in accordance with claim 1, wherein said cabinet has an opening, the cartridge which is pressed by the pushing member being discharged by the opening from the cabinet.

* * * * *